US008925878B2

(12) United States Patent
Hsu et al.

(10) Patent No.: US 8,925,878 B2
(45) Date of Patent: *Jan. 6, 2015

(54) SUPPORT STRUCTURE FOR TABLET DISPLAY APPARATUS

(75) Inventors: An Szu Hsu, New Taipei (TW); Chien Yu Lin, New Taipei (TW)

(73) Assignee: First Dome Corporation, New Taipei (TW)

(*) Notice: Subject to any disclaimer, the term of this patent is extended or adjusted under 35 U.S.C. 154(b) by 78 days.

This patent is subject to a terminal disclaimer.

(21) Appl. No.: 13/454,341

(22) Filed: Apr. 24, 2012

(65) Prior Publication Data

US 2013/0181099 A1    Jul. 18, 2013

(30) Foreign Application Priority Data

Jan. 17, 2012 (TW) .............................. 101101849 A

(51) Int. Cl.
*A47F 5/00* (2006.01)
*A47F 5/02* (2006.01)
*H05K 7/14* (2006.01)

(52) U.S. Cl.
USPC ........ 248/122.1; 248/921; 248/922; 248/923; 248/284.1; 248/292.12; 248/292.13; 248/291.1; 248/124.1; 361/679.3; 361/679.56; 361/679.07; 361/679.21; 361/679.2; 361/679.22; 361/679.29; 361/679.27

(58) Field of Classification Search
USPC ................... 248/91–923; 361/679.3, 679.56, 361/679.07, 679.21, 679.2, 679.22, 679.29, 361/679.27
See application file for complete search history.

(56) References Cited

U.S. PATENT DOCUMENTS

| 5,923,528 | A* | 7/1999 | Lee ............................. 361/679.07 |
| 5,941,493 | A* | 8/1999 | Cheng ........................... 248/371 |
| 6,437,975 | B1* | 8/2002 | Huang ..................... 361/679.22 |
| 7,798,457 | B2* | 9/2010 | Chih et al. ................ 248/284.1 |
| 8,282,060 | B2* | 10/2012 | Fan ............................. 248/291.1 |
| 2011/0290970 | A1* | 12/2011 | Fan ............................. 248/274.1 |
| 2012/0170212 | A1* | 7/2012 | Gallouzi et al. ......... 361/679.56 |
| 2013/0180934 | A1* | 7/2013 | Hsu et al. ........................ 211/26 |
| 2013/0181903 | A1* | 7/2013 | Hsu et al. ...................... 345/168 |

* cited by examiner

*Primary Examiner* — Christopher Garft
(74) *Attorney, Agent, or Firm* — Rosenberg, Klein & Lee

(57) ABSTRACT

A support structure for tablet display apparatus includes a support member and a connection assembly. The support member has a first end section and a second end section opposite to the first end section. The first end section is connected with the connection assembly via an angle adjustment seat, whereby the connection assembly can be rotated or tilted relative to the angle adjustment seat and located. The connection assembly is formed with a receiving space for receiving a tablet display apparatus. The second end section of the support member is pivotally connected with a base seat. Accordingly, the tablet display apparatus can be rotated and tilted by different angles and supported in an inclined position in adaptation to different situations and requirements.

12 Claims, 8 Drawing Sheets

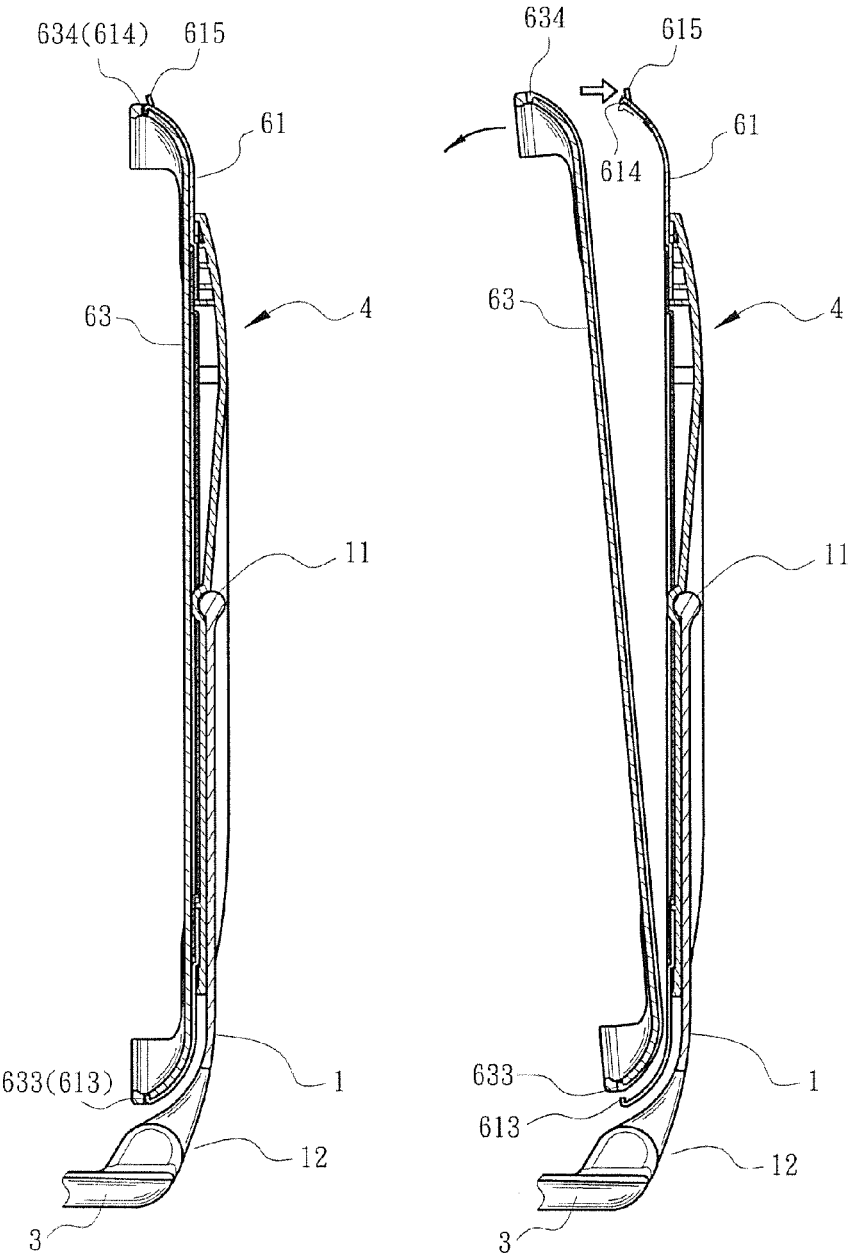

SUPPORT STRUCTURE FOR TABLET DISPLAY APPARATUS

BACKGROUND OF THE INVENTION

1. Field of the Invention

The present invention relates generally to a support structure for tablet display apparatus, and more particularly to a support structure for tablet display apparatus, by means of which a user can tilt and rotate the tablet display apparatus by different angles to adjust the angular position of the tablet display apparatus in adaptation to different viewing situations.

2. Description of the Related Art

There are various conventional support structures and protection jacket structures for tablet computers. For example, a prior art discloses a support structure for tablet computer. The support structure is mainly composed of a fixing board body and a support member pivotally connected with the fixing board body. The fixing board body includes a front cover and a rear cover connected with the front cover. The rear cover has multiple locating members extending from the rear cover to the front cover. The rear cover is connected with multiple holding boards. Each holding board is formed with a guide slot for the locating member to slide along. The locating member provides a restriction effect for the guide slot so as to limit the holding board to move within a certain range.

In addition, an extensible member is disposed at the guide slot for the holding board to abut against and hold the tablet computer. Accordingly, by means of the extensible members, the holding boards can securely hold different sizes of tablet computers. However, the above structure can only hold and support the tablet computer in a fixed angular viewing position. Therefore, the application of the support structure cannot be diversified to meet various use requirements.

Another prior art discloses a support box structure for tablet computer. The support box structure includes a box body with a shutter box cover. The box body has a receiving cavity in which a Bluetooth wireless transmission keyboard can be snugly inserted. The box cover has an interlayer. A base shaft of the interlayer is pivotally connected with a support board. A rear shaft of the support board is pivotally connected with a support leg. When the box cover is stretched and horizontally rested, the support leg supports the support board to extend by an inclination for placing the tablet computer thereon. Accordingly, the tablet computer can be placed on a desktop and conveniently used in adaptation to the operation mode of a user who is familiar with solid keyboard. By means of such structure, the tablet computer can be supported by different inclination angles. However, the keyboard cannot be tilted to facilitate the operation. Moreover, it is still uneasy to operation the tablet computer to provide transverse display effect. As a result, the use of the tablet computer is still limited.

Still another prior art discloses a protection jacket for tablet computer. The protection jacket includes an upper cover and a base seat. A second turn section is formed between the upper cover and the base seat, whereby the upper cover and the base seat can be folded onto each other. A first turn section is formed near the middle of the base seat, whereby the base seat can be folded by a certain angle. Several magnets are disposed in the upper cover at intervals. According to the above arrangement, the tablet computer can be affixed to the base seat. The iron core inbuilt and concealed in the periphery of the tablet computer and the magnets of the upper cover can attract each other. In addition, the first and second turn sections can be folded so that the iron core can be attracted by different magnets in different positions, whereby the viewing angle of the tablet computer can be adjusted. Moreover, the protection jacket serves to protect the tablet computer from being scraped. By means of the above structure, the tablet computer can be supported by different inclination angles. However, the protection jacket cannot be connected with a keyboard.

It is therefore tried by the applicant to provide a support structure for tablet display apparatus to overcome the shortcomings existing in the conventional support structures and protection jacket structures for tablet computers.

SUMMARY OF THE INVENTION

It is therefore a primary object of the present invention to provide a support structure for tablet display apparatus. By means of the support structure, a user can tilt and rotate the tablet display apparatus by different angles and support/locate the screen of the tablet display apparatus in different angular positions to diversify the application of the tablet display apparatus.

To achieve the above and other objects, the support structure for tablet display apparatus of the present invention includes a support member and a connection assembly. The support member has a first end section and a second end section opposite to the first end section. The connection assembly is connected to the first end section of the support member. The connection assembly has a receiving space for receiving a tablet display apparatus with a screen.

In the above support structure for tablet display apparatus, the second end section of the support member is pivotally connected with a base seat via a second pivot member.

In the above support structure for tablet display apparatus, the base seat is formed with a pivot dent for receiving the second end section of the support member. The outer periphery of the second end section is formed with an abutment section for abutting against a bottom face of the pivot dent in pivotal rotation of the support member.

In the above support structure for tablet display apparatus, an angle adjustment seat is disposed between the support member and the connection assembly. The angle adjustment seat is pivotally connected to the first end section of the support member via at least one first pivot member. The angle adjustment seat is formed with a receiving section with an opening. At least one engagement locating member is disposed in the receiving section. The engagement locating member is constantly outward elastically pushed by a preset elastic member. The connection assembly is relatively rotatably connected to one side of the angle adjustment seat, which side is formed with the receiving section. The connection assembly has a hollow section corresponding to the receiving section. An inner periphery of the hollow section is formed with multiple locating recesses for the engagement locating member to elastically engage in. The connection assembly is formed with a receiving space for receiving the tablet display apparatus.

In the above support structure for tablet display apparatus, the connection assembly includes a fixing seat. The receiving space is formed on the fixing seat.

In the above support structure for tablet display apparatus, the connection assembly further includes a retainer member. The hollow section is formed on the fixing seat. The fixing seat is connected to the angle adjustment seat by means of the retainer member.

In the above support structure for tablet display apparatus, the connection assembly further includes a connection member. The hollow section is formed on the connection member.

The connection member is connected to the angle adjustment seat by means of a retainer member. The fixing seat is detachably connected to the connection member.

In the above support structure for tablet display apparatus, a first edge of the connection member is formed with at least one first locating section and a second edge of the connection member opposite to the first edge is formed with at least one second locating section. The fixing seat is formed with at least one first located section and at least one second located section corresponding to the first and second locating sections respectively.

In the above support structure for tablet display apparatus, the first and second locating sections are hook section and hook structure respectively, while the first and second located sections are located guide slot and engagement guide slot respectively.

In the above support structure for tablet display apparatus, a bottom side of the receiving section is formed with at least one passage in communication with a backside of the receiving section. The first pivot member is disposed in the receiving section. The first pivot member has a pivot end with pivotally locating function. The pivot end passes through the passage to connect with the first end section of the support member.

In the above support structure for tablet display apparatus, at least one guide way is disposed on a periphery of the receiving section for guiding the engagement locating member to move along the guide way. A locating section is disposed between the passage and the guideway for fixing one end of the elastic member. The other end of the elastic member serves to push the engagement locating member.

The present invention can be best understood through the following description and accompanying drawings, wherein:

BRIEF DESCRIPTION OF THE DRAWINGS

FIG. 9 is a sectional view of the second embodiment of the present invention, showing that the connection member is detached from the fixing seat; and FIG. 10 is a sectional view of the second embodiment of the present invention, showing that the fixing seat is assembled with the connection member.

DETAILED DESCRIPTION OF THE PREFERRED EMBODIMENTS

Figure 1:
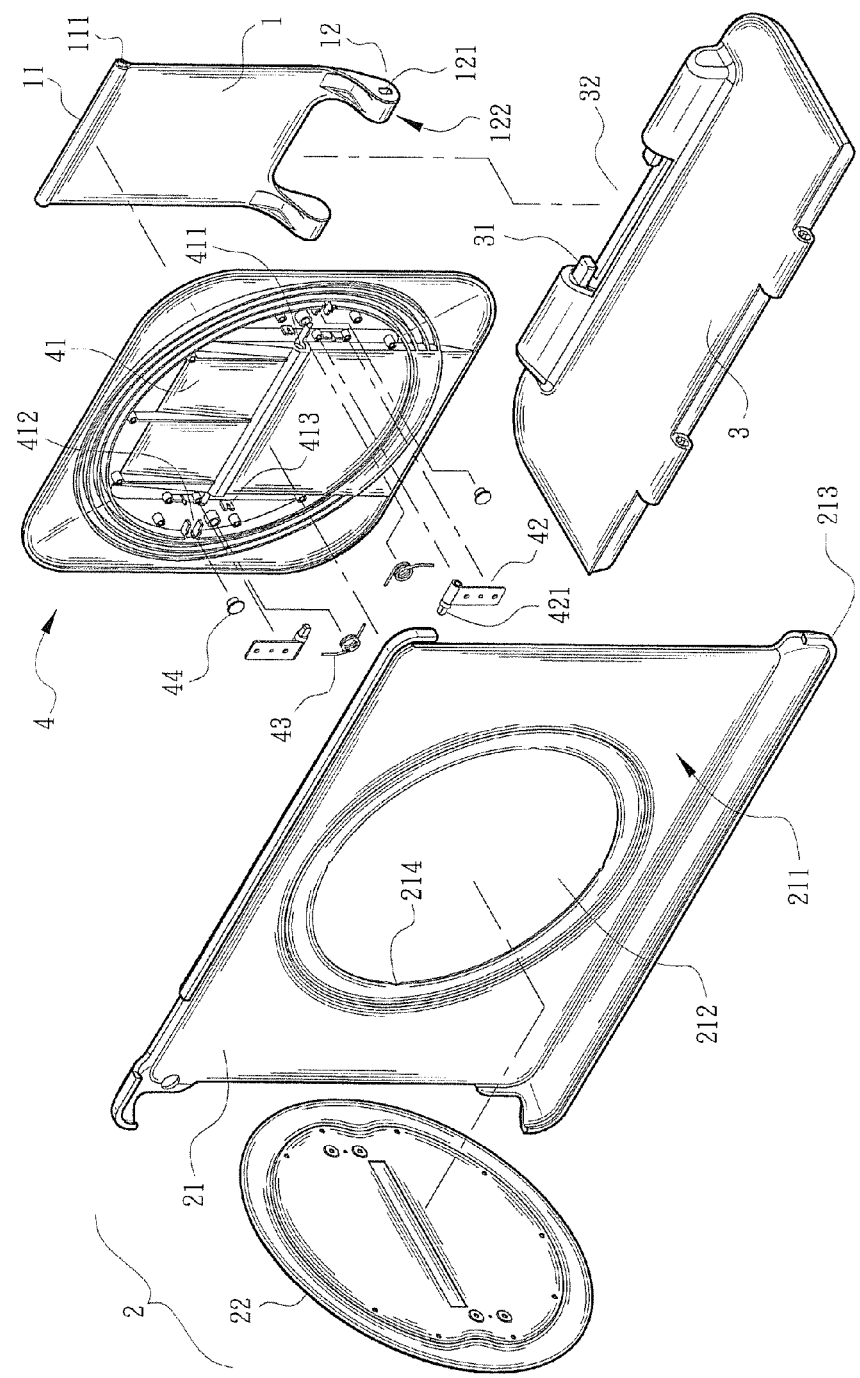
FIG. 1 is a perspective exploded view of a first embodiment of the present invention.
Figure 2:
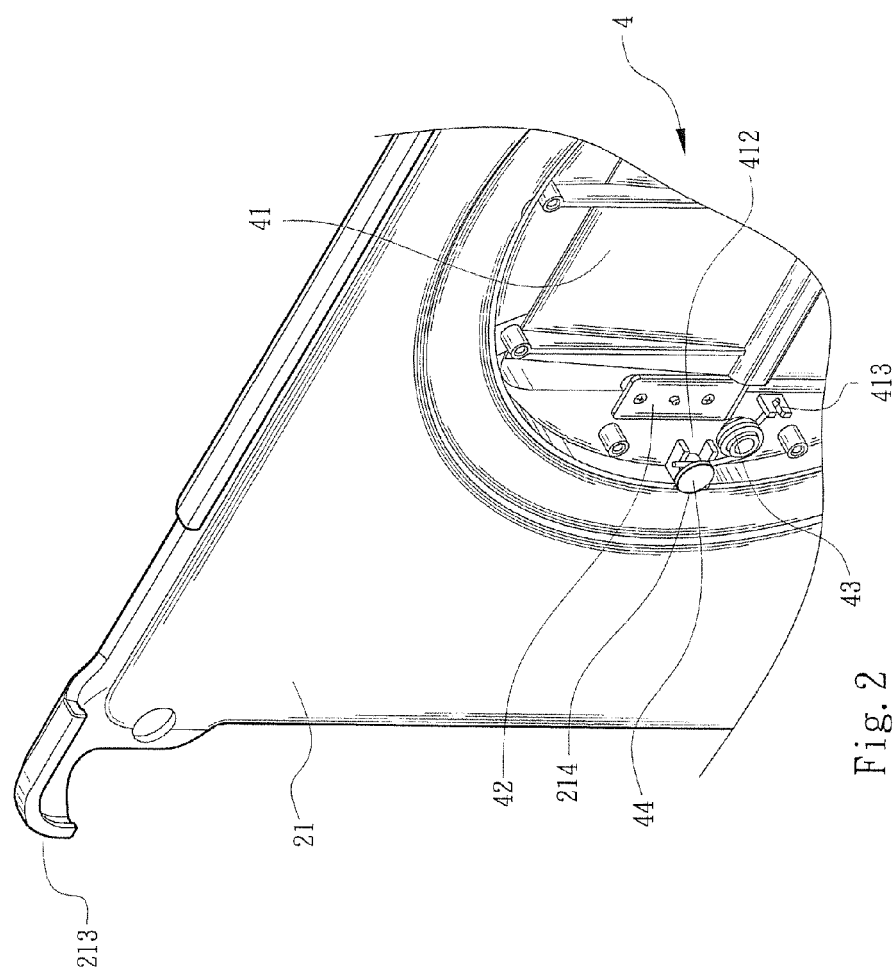
FIG. 2 is a perspective assembled view of the angle adjustment seat and the fixing seat of the first embodiment of the present invention, showing the internal structure of the angle adjustment seat and relevant parts of the fixing seat.

Please refer to FIGS. 1 and 2. The support structure for tablet display apparatus of the present invention includes a support member 1 and a connection assembly 2. The support member 1 has a first end section 11 and a second end section 12 opposite to the first end section 11. Two sides of the first end section 11 are respectively formed with two shaft holes 111. Two sides of the second end section 12 are respectively formed with two shaft holes 121. The outer periphery of the second end section 12 is formed with an abutment section 122. The connection assembly 2 can be directly or indirectly connected to the first end section 11 of the support member 1. (In this embodiment, the connection assembly 2 is pivotally connected to the first end section 11 of the support member 1 via an angle adjustment seat 4. However, in practice, the connection assembly 2 can be alternatively directly pivotally connected to the first end section 11 of the support member 1). The second end section 12 of the support member 1 can be connected with a base seat 3 as necessary to form a first embodiment of the present invention.

The connection assembly 2 is composed of a fixing seat 21 and a retainer member 22. One side of the fixing seat 21 is formed with a receiving space 211 for receiving a tablet display apparatus 5 (such as a tablet computer or a cellular phone). The periphery of the receiving space 211 is formed with a protruding holding section 213 for locating the tablet display apparatus 5. A center of the fixing seat 21 (the receiving space 211) is formed with a hollow section 212. An inner periphery of the hollow section 212 is formed with multiple locating recesses 214 arranged at predetermined angular intervals. The retainer member 22 has an area larger than that of the hollow section 212 and is connected to the hollow section 212 of the fixing seat 21.

A center of the angle adjustment seat 4 is formed with a receiving section 41 with an opening corresponding to the hollow section 212 of the fixing seat 21. The retainer member 22 can be mated with one side of the hollow section 212, which side is distal from the angle adjustment seat 4, to cover the hollow section 212. Accordingly, the fixing seat 21 can be assembled with the angle adjustment seat 4 and rotated relative to the angle adjustment seat 4. A bottom side of the receiving section 41 is formed with transversely extending passage 411 in communication with a backside of the receiving section 41. Two guide ways 412 are disposed on two lateral sides of the passage 411. A locating section 413 is disposed between the passage 411 and each guide way 412. Multiple first pivot members 42 are disposed on the lateral sides of the passage 411. Each first pivot member 42 has a pivot end 421 with pivotally locating function. The pivot end 421 passes through the passage 411 to connect with the shaft hole 111 of the support member 1. Accordingly, the angle adjustment seat 4 can be pivotally rotated and tilted around the first end section 11 of the support member 1. Multiple elastic members 43, (which can be coiled springs), are respectively arranged between the locating sections 413 and the guide ways 412. Each elastic member 43 has a first end affixed to the locating section 413 and a second end extending into the guideway 412 for constantly elastically urging an engagement locating member 44, (which can be a roller), to move outward and engage in the locating recess 214. Accordingly, the fixing seat 21 of the connection assembly 2 is rotatably located on the angle adjustment seat 4.

The base seat 3 has a pivot dent 32 for receiving the second end section 12 of the support member 1. Two second pivot members 31 with pivotally locating function are respectively disposed on two inner opposite sides of the pivot dent 32. The second pivot members 31 are connectable in the shaft holes 121 of the support member 1. When the support member 1 is pivotally rotated, the abutment section 122 of the support member 1 serves to abut against a bottom face of the pivot dent 32 so as to restrict the pivotally rotational angle of the support member 1 relative to the base seat 3.

Please now refer to FIGS. 3 to 7. In use of the first embodiment of the present invention, the base seat 3 is rested on a preset plane face (such as a table face). The support member 1 is pivotally rotated relative to the base seat 3 (with the abutment section 122 abutting against the bottom face of the pivot dent 32 to restrict the pivotally rotational angle of the support member 1) and the fixing seat 21 of the connection assembly 2 is rotated relative to the angle adjustment seat 4 (or the support member 1). Accordingly, the tablet display apparatus 5 fixed on the fixing seat 21 can be upright positioned or tilted by a certain angle.

When not used, the support member 1 can be pivotally rotated to make the screen side of the tablet display apparatus 5 attach to and overlap the base seat 3 so as to minimize the occupied room for easy storage or carriage.

Figure 7:
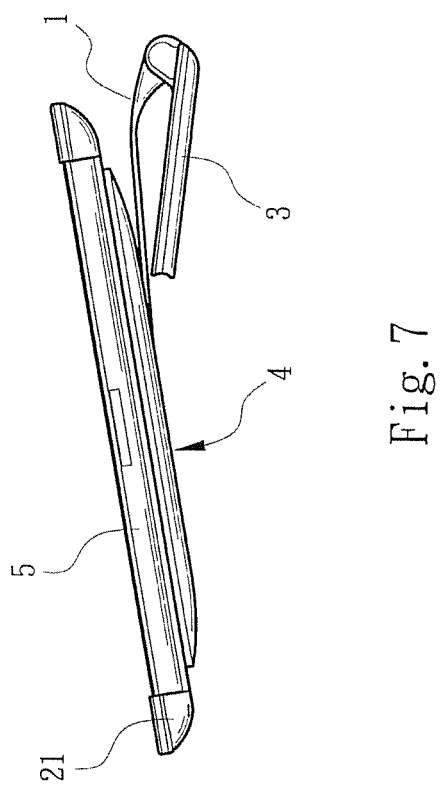
FIG. 7 is a side view of the first embodiment of the present invention, showing the use of the tablet display apparatus, in which the fixing seat overlaps the base seat with the screen of the tablet display apparatus facing upward.

Alternatively, the angle adjustment seat 4 with the tablet display apparatus 5 can be totally reversely pivotally rotated around the first end section 11 of the support member 1. Then the support member 1 can be attached to the base seat 3. In this case, the tablet display apparatus 5 is horizontally rested on the plane face with the screen facing upward in a ready state (as shown in FIG. 7).

Figure 3:
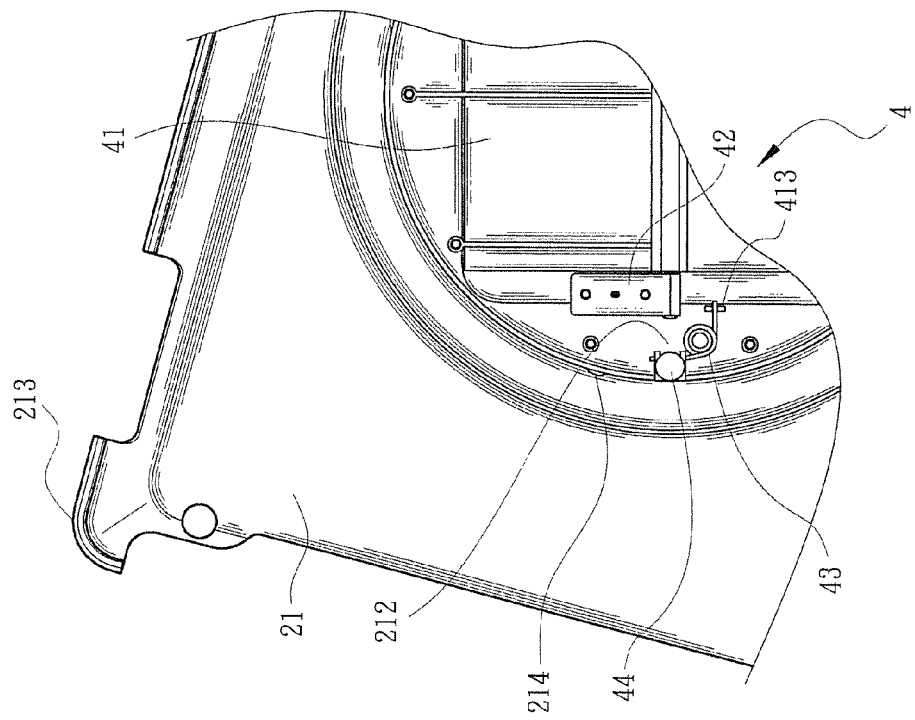
FIG. 3 shows that the engagement locating member of the angle adjustment seat is engaged in a predetermined locating recess in an initial position.
Figure 4:
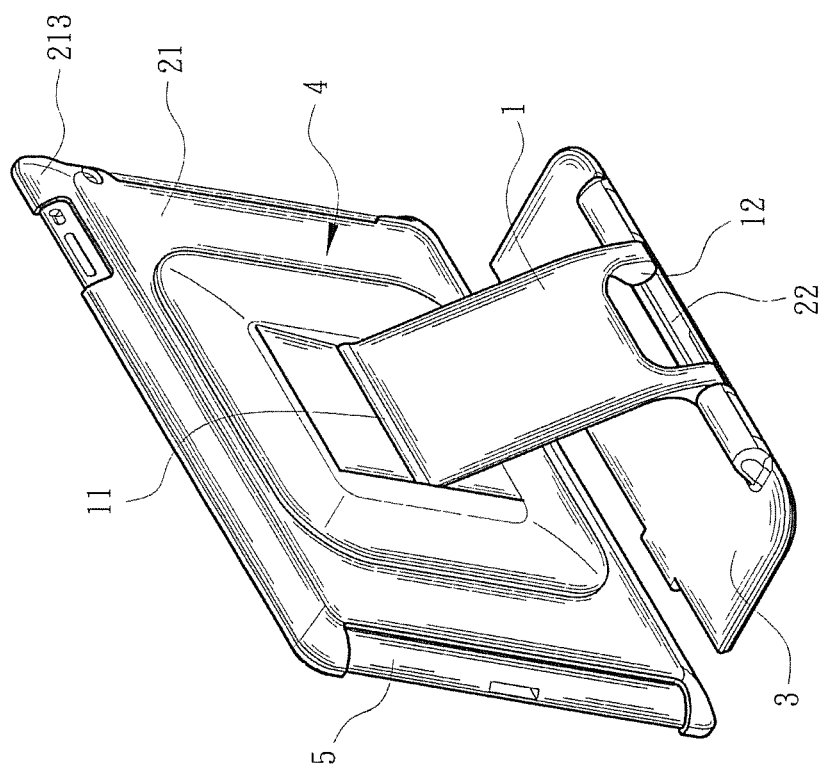
FIG. 4 is a perspective view showing the use of the tablet display apparatus according to FIG. 3.

The engagement locating members 44 of the angle adjustment seat 4 are engaged in the locating recesses 214 formed on the periphery of the hollow section 212 of the fixing seat 21 as in an initial position (as shown in FIG. 3). Under such circumstance, the fixing seat 21 with the tablet display apparatus 5 is positioned in a transverse position (as shown in FIG. 4).

Figure 5:
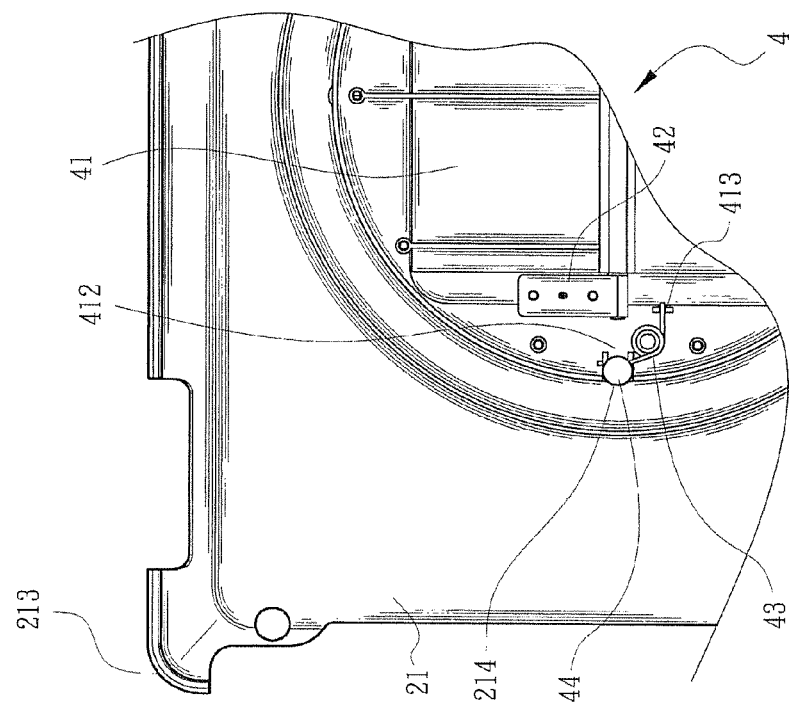
FIG. 5 shows that the connection assembly of the first embodiment of the present invention is rotated to disengage the engagement locating member from the locating recess as shown in FIG. 3.
Figure 6:
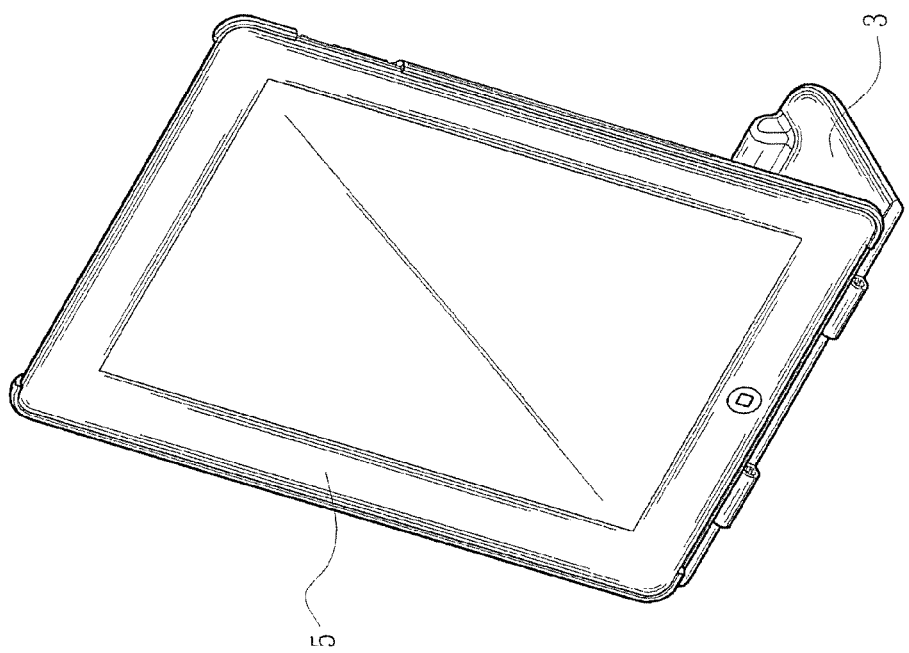
FIG. 6 is a perspective view showing the use of the tablet display apparatus, which is 90-degree rotated from the position of FIG. 4 to an upright position.

When it is necessary to rotate the screen of the tablet display apparatus 5, the fixing seat 21 with the tablet display apparatus 5 is rotated to disengage the engagement locating members 44 from the original locating recesses 214. At this time, the elastic members 43 are twisted and the engagement locating members 44 slide or roll along the inner periphery of the hollow section 212 to the other locating recesses 214 (as shown in FIG. 5) until the engagement locating members 44 are engaged and located in the other locating recesses 214. Accordingly, the electronic apparatus 5 can be rotated by different angles and located in different angular positions (such as a vertical position as shown in FIG. 6) in adaptation to different use situations and requirements.

Figure 8:
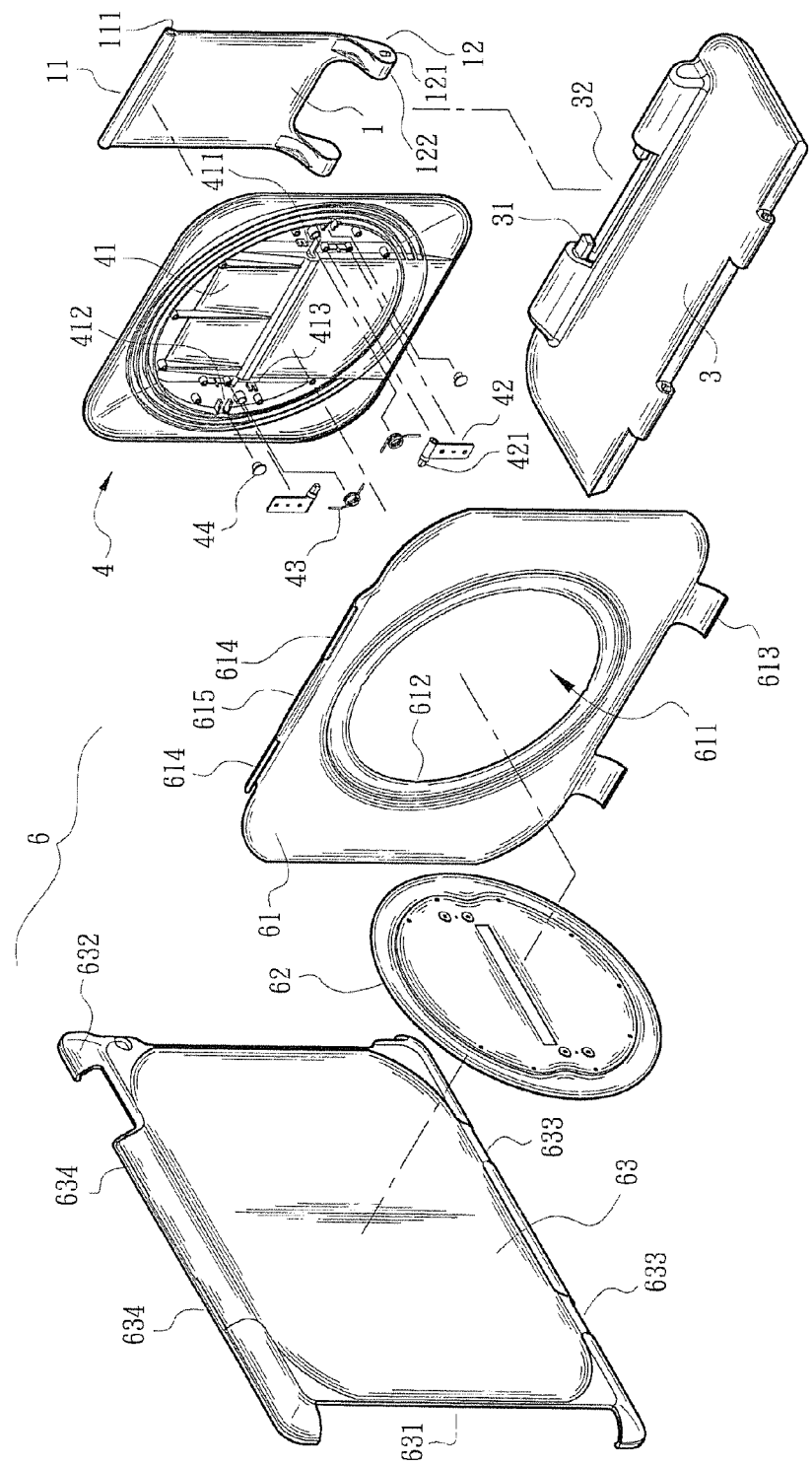
FIG. 8 is a perspective exploded view of a second embodiment of the present invention.

Please refer to FIGS. 8 to 10, which show a second embodiment of the present invention. The second embodiment is derived from the first embodiment. According to the second embodiment, the present invention includes a connection assembly 6 and components of a base seat 3, an angle adjustment seat 4 and a support member 1, which are identical to those of the first embodiment. The connection assembly 6 includes a fixing seat 63, a retainer member 62 and a connection member 61. A center of the connection member 61 is formed with a hollow section 611 corresponding to the receiving section 41. An inner periphery of the hollow section 611 is formed with multiple locating recesses 612 arranged at predetermined angular intervals. The engagement locating members 44 can be engaged and located in the locating recesses 612. A first edge of the connection member 61 is formed with multiple first locating sections 613 extending in the same direction. (The first locating sections 613 can be hook sections). A second edge of the connection member 61 opposite to the first edge is formed with multiple second locating sections 614 extending in the same direction. The second locating sections 614 have hook structures. The second edge is further formed with a raised shift section 615 for shifting the second locating sections 614.

The retainer member 62 has an area larger than that of the hollow section 611 and is connected to one side of the connection member 61, which side is distal from the angle adjustment seat 4. The retainer member 62 covers the hollow section 611 to prevent the first pivot members 42, the elastic members 43 and the engagement locating members 44 from outward loosening and detaching from the angle adjustment seat 4. Also, the retainer member 62 serves to connect the connection member 61 onto the angle adjustment seat 4, permitting the connection member 61 to be rotated relative to the angle adjustment seat 4.

One side of the fixing seat 63 is formed with a receiving space 631 for receiving a tablet display apparatus 5 (such as a tablet computer or a cellular phone). The periphery of the receiving space 631 is formed with a protruding holding section 632 for locating the tablet display apparatus 5. A first edge of the fixing seat 63 is formed with multiple first located sections 633 opposite to the receiving space 631, (which can be located guide slots). A second edge of the fixing seat 63 is formed with multiple second located sections 634 opposite to the receiving space 631, (which can be engagement guide slots). The first and second located sections 633, 634 correspond to the first and second locating sections 613, 614 of the connection member 61 respectively.

When assembled, the first locating sections 613 (hook sections) of the connection member 61 extend into the first located sections 633 (located guide slots) of the fixing seat 63, while the second locating sections 614 (hook structures) on the other edge of the connection member 61 are cooperatively inserted into the second located sections 634 (engagement guide slots). Under such circumstance, the connection member 61 is connected with the fixing seat 63 (as shown in FIG. 10). A user can apply a force to the raised shift section 615 to disengage the second locating sections 614 (hook structures) from the second located sections 634 (engagement guide slots) so as to separate the fixing seat 63 from the connection member 61 (as shown in FIG. 9). Accordingly, the connection assembly 6 is easy to assemble and disassemble.

In the second embodiment, only the connection assembly 6 is different from that of the first embodiment in structure, while the angle adjustment seat 4, the base seat 3 and the support member 1 are identical to those components of the first embodiment in structure and connection manner and thus will not be repeatedly described hereinafter.

In conclusion, the support structure for tablet display apparatus of the present invention is connectable with a keyboard and enables a user to adjustably tilt and rotate the screen of the tablet computer by different angles.

The above embodiments are only used to illustrate the present invention, not intended to limit the scope thereof. Many modifications of the above embodiments can be made without departing from the spirit of the present invention.

What is claimed is:

1. A support structure for tablet display apparatus, comprising:
   a support member having a first end section and a second end section opposite to the first end section; and
   a connection assembly, a backside of the connection assembly being connected with the first end section of the support member, the connection assembly having a receiving space for connecting with the tablet display apparatus;

wherein an angle adjustment seat is disposed between the support member and the connection assembly, the angle adjustment seat being pivotally connected to the first end section of the support member via at least one first pivot member, the angle adjustment seat being formed with a receiving section with an opening, at least one engagement locating member being disposed in the receiving section, the engagement locating member being constantly outward elastically pushed by a preset elastic member, the connection assembly being relatively rotatably connected to one side of the angle adjustment seat, said side of the angle adjustment seat is formed with the receiving section, the connection assembly having a hollow section corresponding to the receiving section, an inner periphery of the hollow section being formed with multiple locating recesses for the engagement locating member to elastically engage; and wherein a bottom side of the receiving section is formed with at least one passage in communication with a backside of the receiving section, the first pivot member being disposed in the receiving section, the first pivot member having a pivot end with pivotally locating function, the pivot end passing through the passage to connect with the first end section of the support member.

2. The support structure for tablet display apparatus as claimed in claim 1, wherein the second end section of the support member is pivotally connected to a base seat via a second pivot member.

3. The support structure for tablet display apparatus as claimed in claim 2, wherein the base seat is formed with a pivot dent for receiving the second end section of the support member.

4. The support structure for tablet display apparatus as claimed in claim 3, wherein the second end section is formed with an abutment section for at least partially abutting against a bottom face of the pivot dent in pivotal rotation of the support member.

5. The support structure for tablet display apparatus as claimed in claim 1, wherein the connection assembly includes a fixing seat, the receiving space being formed on the fixing seat.

6. The support structure for tablet display apparatus as claimed in claim 5, wherein the connection assembly further includes a retainer member, the hollow section being formed on the fixing seat, the fixing seat being connected to the angle adjustment seat by means of the retainer member.

7. The support structure for tablet display apparatus as claimed in claim 5, wherein the connection assembly further includes a connection member, the hollow section being formed on the connection member, the connection member being connected to the angle adjustment seat by means of a retainer member, the fixing seat being detachably connected to the connection member.

8. The support structure for tablet display apparatus as claimed in claim 7, wherein a first edge of the connection member is formed with at least one first locating section and a second edge of the connection member opposite to the first edge is formed with at least one second locating section, the fixing seat being formed with at least one first located section and at least one second located section corresponding to the first and second locating sections respectively.

9. The support structure for tablet display apparatus as claimed in claim 8, wherein the first and second locating sections are a hook section and a hook structure respectively, while the first and second located sections are a located guide slot and an engagement guide slot respectively.

10. The support structure for tablet display apparatus as claimed in claim 1, wherein at least one guide way is disposed on a periphery of the receiving section for guiding the engagement locating member to move along the guide way, a locating section being disposed between the passage and the guide way for fixing one end of the elastic member, the other end of the elastic member serving to push the engagement locating member.

11. The support structure for tablet display apparatus as claimed in claim 7, wherein at least one guide way is disposed on a periphery of the receiving section for guiding the engagement locating member to move along the guide way, a locating section being disposed between the passage and the guide way for fixing one end of the elastic member, the other end of the elastic member serving to push the engagement locating member.

12. The support structure for tablet display apparatus as claimed in claim 8, wherein at least one guide way is disposed on a periphery of the receiving section for guiding the engagement locating member to move along the guide way, a locating section being disposed between the passage and the guide way for fixing one end of the elastic member, the other end of the elastic member serving to push the engagement locating member.

* * * * *